(12) United States Patent
Devine et al.

(10) Patent No.: US 6,199,686 B1
(45) Date of Patent: Mar. 13, 2001

(54) SIDE SEAL ASSEMBLY FOR A CONVEYORIZED WORK SUPPORTING TABLE WITH VACUUM HOLDDOWN

(75) Inventors: Lawrence E. Devine, Manchester; John M. Davies, Willington, both of CT (US); Richard Kuchta, Shickshinny, PA (US)

(73) Assignee: Gerber Technology, Inc., Tolland, CT (US)

( * ) Notice: Subject to any disclaimer, the term of this patent is extended or adjusted under 35 U.S.C. 154(b) by 0 days.

(21) Appl. No.: 09/374,157

(22) Filed: Aug. 13, 1999

(51) Int. Cl.[7] .................................................. B65G 15/18
(52) U.S. Cl. .......................................................... 198/836.1
(58) Field of Search ............................ 198/836.1, 689.1; 271/94, 276, 197; 83/941

(56) References Cited

U.S. PATENT DOCUMENTS

| | | | |
|---|---|---|---|
| 4,322,993 | * | 4/1982 | Stumpf .................................. 198/689 |
| 4,730,526 | * | 3/1988 | Pearl et al. ........................... 198/689.1 |
| 5,277,246 | * | 1/1994 | Monch .................................. 198/841 |
| 5,596,917 | * | 1/1997 | Gerber et al. ......................... 83/941 |
| 5,819,383 | * | 10/1998 | Jourde et al. ........................ 198/804 |
| 5,836,224 | * | 11/1998 | Gerber .................................. 83/941 |

* cited by examiner

Primary Examiner—Douglas Hess
(74) Attorney, Agent, or Firm—McCormick, Paulding & Huber LLP (57) ABSTRACT

A side seal assembly is provided in a conveyorized work supporting table with vacuum holddown for conveying work material covered with an air impermeable overlay sheet. The table has first and second longitudinally extending side members and has a plurality of bristle blocks forming a work supporting surface which are movable by a conveyor undersurface. The work supporting surface has first and second longitudinally extending side edges spaced laterally inwardly of the first and second side members respectively. The bristle blocks include a set of bristle blocks positioned side by side along the length of the table and define one of the side edges of the work supporting surface. The side seal assembly includes a stationary side seal having an outward edge and an inward edge and is fixed relative to one of the side members of the conveyorized table to extend longitudinally along the table over a marginal area of the table located outwardly of and adjacent to one of the side edges of the work supporting surface. A plurality of movable, semi air permeable side seals are provided and are each associated with and to be movable in unison with bristle blocks defining the one side edge. Each of the movable side seals is a thin strip of material covering an area of the associated bristle block adjacent to the side edge to inhibit the overlay sheet from being drawn by the vacuum of the vacuum holddown into the bristles of the bristle block in the covered area.

11 Claims, 5 Drawing Sheets

SIDE SEAL ASSEMBLY FOR A CONVEYORIZED WORK SUPPORTING TABLE WITH VACUUM HOLDDOWN

FIELD OF THE INVENTION

The present invention relates generally to a side seal assembly for a conveyorized table, and more particularly to a side seal assembly for a conveyorized work supporting table with vacuum holddown having stationary and movable seal components to prevent an air impermeable overlay sheet covering the work material from being drawn downwardly into the work supporting surface.

BACKGROUND OF THE INVENTION

Conveyorized work supporting tables having bristle blocks forming the work supporting surface typically include a vacuum holddown system to create an air pressure difference between an upper surface of the work material or overlay material supported on bristle blocks and the pressure at an upper surface of the bristle blocks. Atmospheric pressure at the upper surface of the work material or overlay material is higher than that at a lower surface of the work material or overlay sheet supported on the upper surface of the bristle blocks so that the work material to be conveyed along the table is drawn downwardly toward and into secure engagement with the upper surface of the bristle blocks to prevent sliding of the work material over the bristle blocks. An air impermeable overlay sheet typically covers the work material to further prevent shifting of the work material, and more particularly, to prevent several plies of work material from shifting relative to each other. Maintaining registration among several plies of work material is critical when, for example, the plies are to be cut as a unit along a conveyorized cutting device. Such conveyors typically further include stationary side seals in the form of elongated strips of air impermeable material which are coupled to side members of the conveyorized table and which extend inwardly over a portion of the bristle blocks. An outward portion of the overlay sheet slides along an upper surface of the stationary side seal while an inward portion of the overlay sheet is held securely against the adjacent bristle blocks and the work material by the pressure difference between upper and lower surfaces of the overlay sheet generated by the vacuum holddown system. A drawback with this side seal assembly is that mechanical shear experienced by bristles by rubbing against the stationary side seal at an interface line defined by the boundary of the side seal and the bristle blocks causes the overlay sheet to stretch and create a wrinkle or crease. The crease created in the overlay sheet near the interface line causes the bristles to part or bend inwardly of the table such that the creased portion of the overlay sheet is drawn downwardly into the bristles forming a crevice. Crevicing of the overlay sheet near the interface line can lead to jamming of the overlay sheet with a take-off ramp of the conveyorized table. Another drawback is that a portion of the overlay sheet in the vicinity of the interface line slides along the stationary seal and thus is not securely held down thereto to prevent the portion of the overlay sheet over the side seal from being drawn inwardly toward and downwardly into the adjacent bristle blocks.

It is therefore an object of the present invention to provide a side seal assembly for a conveyorized table with vacuum holddown which significantly minimizes an overlay sheet from being drawn downwardly into bristle blocks at an interface of the bristle blocks and a side seal.

Other objects of the present invention will be made apparent from the following description and accompanying drawings.

SUMMARY OF THE INVENTION

A side seal assembly is provided in a conveyorized work supporting table with vacuum holddown for conveying work material covered with an air impermeable overlay sheet. The table has first and second longitudinally extending side members and has a plurality of bristle blocks forming a work supporting surface which are movable by a conveyor undersurface. The work supporting surface has first and second longitudinally extending side edges spaced laterally inwardly of the first and second side members respectively. The bristle blocks include a set of bristle blocks positioned side by side along the length of the table and define one of the side edges of the work supporting surface.

The side seal assembly includes a stationary side seal having an outward edge and an inward edge and is fixed relative to one of the side members of the conveyorized table to extend longitudinally along the table over a marginal area of the table located outwardly of and adjacent to one of the side edges of the work supporting surface. A plurality of movable, semi air permeable side seals are provided and are each associated with and to be movable in unison with bristle blocks defining the one side edge. Each of the movable side seals is a thin strip of material covering an area of the associated bristle block adjacent to the side edge to inhibit the overlay sheet from being drawn by the vacuum of the vacuum holddown into the bristles of the bristle block near the side edge.

The movable side seals are of an air permeable material or an air impermeable material defining a plurality of holes for accommodating air flow therethrough.

Preferably, the side seal assembly includes a plurality of end seal members each to be interposed between a side member of the conveyorized table and an associated bristle block for movement along a length of the table with the bristle blocks. Each of the movable side seal members may be fixedly coupled to either an associated end seal member or an associated bristle block.

DETAILED DESCRIPTION OF THE PREFERRED EMBODIMENT

Figure 1:
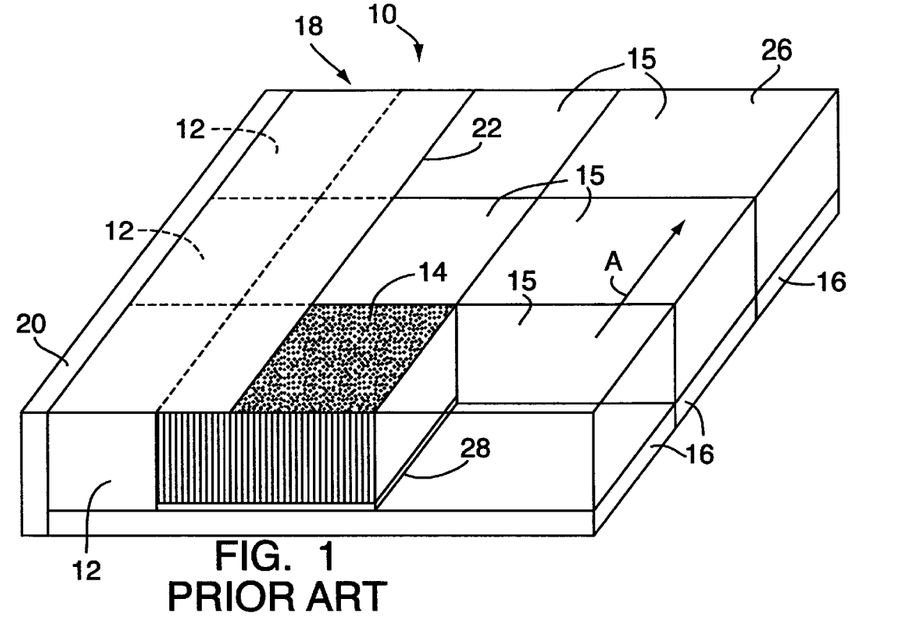
FIG. 1 is a schematic, perspective view of a portion of a side seal assembly for a conveyorized table with vacuum holddown and employing bristle blocks as the work support surface in accordance with existing technology.
Figure 2:
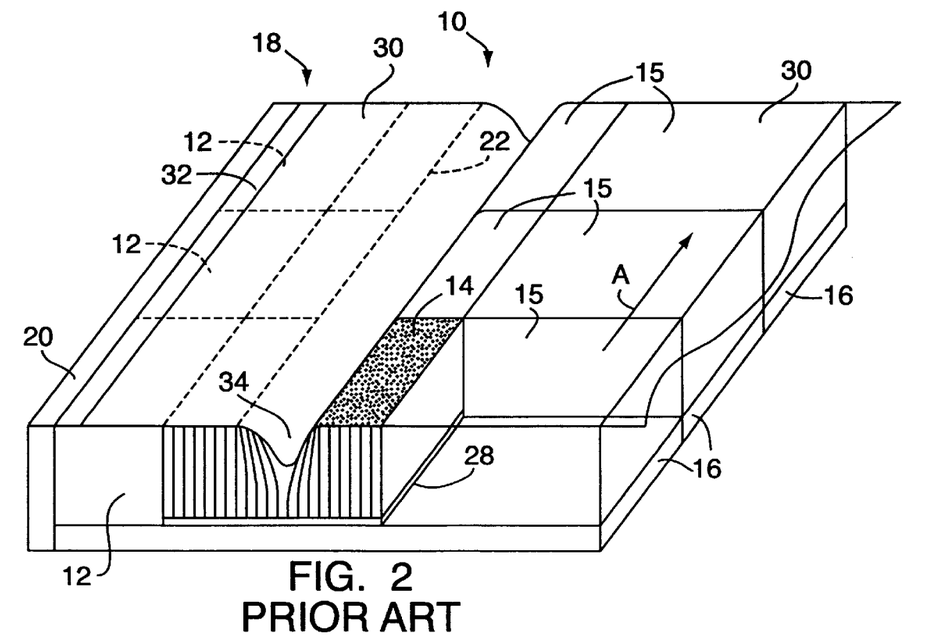
FIG. 2 is a schematic, perspective view of the side seal assembly of FIG. 1 showing a crevicing of an overlay sheet downwardly into the bristle blocks during movement of the conveyorized table.

With reference to FIGS. 1 and 2, a portion of a prior side seal assembly for a conveyorized work supporting table with vacuum holddown is generally designated by the reference number 10. The side seal assembly includes a plurality of end seal members 12, 12 generally in the form of rectangular or square blocks disposed outwardly of and adjacent to bristle blocks 14, 14 (only one shown) which form the work supporting surface. For simplicity of illustration, only a portion of the side seal assembly on one side of a conveyorized table is shown, and only one bristle block 14 is shown as occupying bristle block position areas 15, 15. It is therefore to be understood that a mirror image side seal assembly is to be disposed on the other side of the conveyorized table. The end seal members 12, 12 and the bristle blocks 14, 14 are fixedly coupled to slats 16, 16 forming part of a conveyor undersurface such that the end seal members and the bristle blocks move together along a length of the conveyorized table in the direction shown by arrow A.

A stationary side seal 18 in the form of an elongated strip of air impermeable material is coupled to a stationary side member 20, such as a plenum wall of the conveyorized table, and extends inwardly over the end seal members 12, 12 and a portion of the bristle blocks 14, 14. An inward edge 22 of the stationary side seal 18 forms an interface line extending along a length of the table between the stationary side seal and some of the bristle blocks 14, 14 disposed adjacent to the end seal members 12, 12. An overlay sheet 24 (see FIG. 2) of air impermeable material covers work material (not shown) to be conveyed along the length of the conveyorized table. A vacuum holddown system (not shown) disposed underneath the bristle blocks 14, 14 generates an air pressure difference such that atmospheric pressure at an upper surface of the overlay sheet 24 is higher than at a lower surface of the sheet supported on an upper surface 26 of the bristle blocks in order to draw the work material and the overlay sheet 24 downwardly toward and into secure engagement with the upper surface of the bristle blocks. A peripheral portion 30 of the overlay sheet 24 typically extends over and slides along an upper, smooth surface 32 of the stationary side seal 18 as the overlay sheet and the work material are carried by the moving work supporting surface along the length of the conveyorized table.

As shown in FIG. 2, as the work supporting surface formed by the bristle blocks 14, 14 moves in the direction of the arrow A, mechanical shear forces are exerted on bristle columns at a portion of the bristle blocks 14, 14 at the interface line 22 because of the frictional contact of the moving bristles against the stationary side seal 18. The mechanical shear forces cause the bristle columns to bend away from the direction of conveyor movement at the interface line 22. The bending bristle columns in turn cause the overlay sheet 24 at the interface line to wrinkle or crease which in turn force the bristle columns to bend inwardly of the table so as to form a gap in the bristle blocks. Because the overlay sheet 24 is flexible, it penetrates and plunges into the gap and forms a crevice 34. The creviced or deformed portion 34 of the overlay sheet 24 may take a permanent set if the overlay sheet is repeatedly used, and may become easily jammed with a take-off ramp of the conveyorized table.

Figure 3:
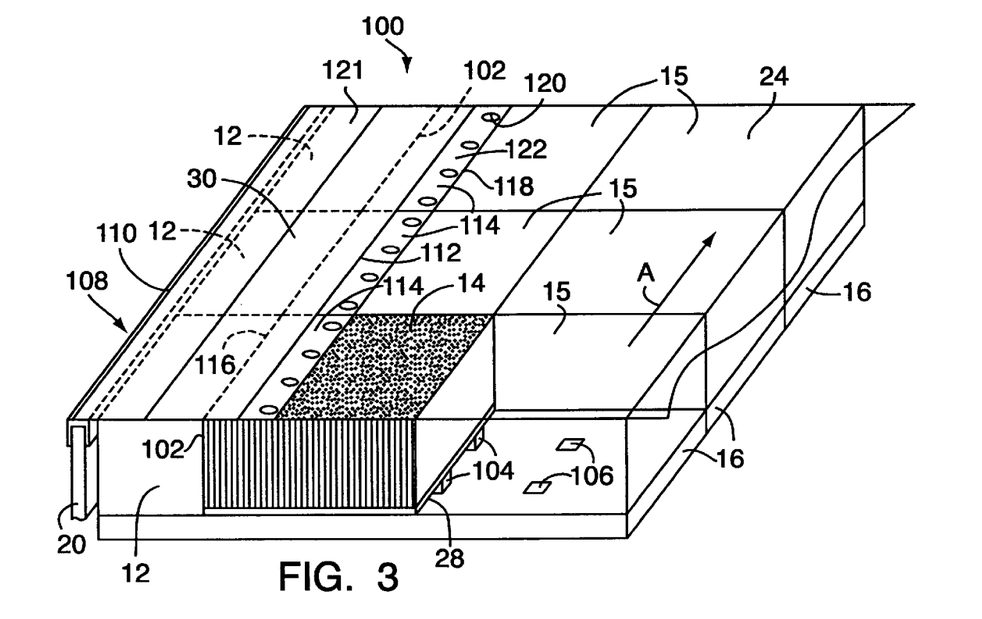
FIG. 3 is a schematic perspective view of a portion of a side seal assembly for a conveyorized table with vacuum holddown and employing bristle blocks as the work support surface in accordance with the present invention.
Figure 4:
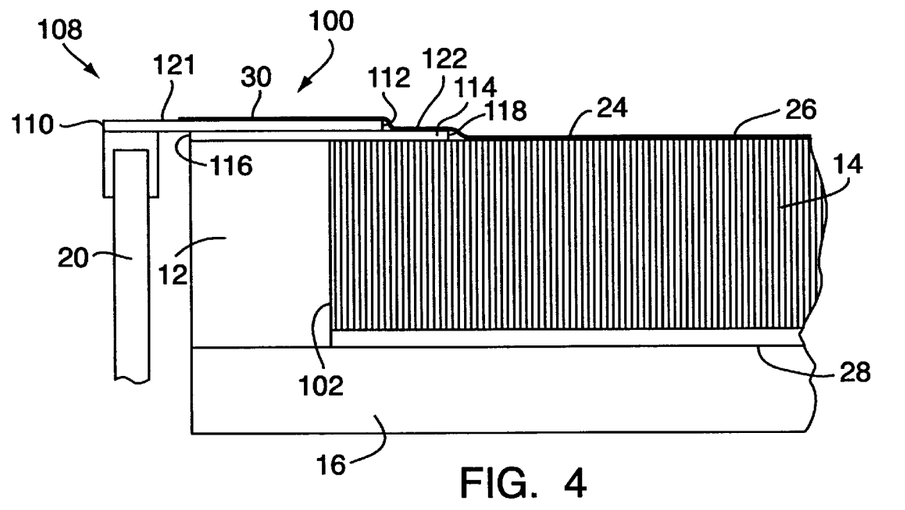
FIG. 4 is a partial, side elevation view of the side seal assembly of FIG. 3.

Turning now to FIGS. 3 and 4, a portion of a side seal assembly for a conveyorized work supporting table with vacuum holddown in accordance with a preferred embodiment of the present invention is generally designated by the reference number 100. Like elements with the previous embodiment are designated with like reference numbers. For simplicity of illustration, only a portion of the side seal assembly on one side of a conveyorized table is shown, and only one of the bristle blocks 14, 14 is shown as occupying bristle block position areas 15, 15. It is therefore to be understood that a mirror image side seal assembly is to be disposed on the other side of the conveyorized table.

The side seal assembly 100 includes a plurality of end seal members 12, 12 generally in the form of rectangular or square blocks disposed outwardly of and adjacent to bristle blocks 14, 14 (only one shown) which form the work supporting surface. Preferably, a set of the bristle blocks 14, 14 are positioned side by side along a length of the table adjacent to and in one-to-one correspondence with associated end seal members 12, 12 such that the set of bristle blocks 14, 14 define a longitudinally extending side edge 102 of the work supporting surface. The end seal members 12, 12 and the bristle blocks 14, 14 are fixedly coupled to slats 16, 16 (only one shown) forming part of a conveyor undersurface such that the end seal members and the bristle blocks move together along a length of the conveyorized table in the direction shown by arrow A. As shown in FIG. 3, for example, each of the bristle blocks 14, 14 may have a plurality of projections 104, 104 extending downwardly from its lower surface 28 to be received within corresponding mounting holes 106, 106 defined in the slats 16, 16 for securing the bristle blocks to the slats.

A stationary side seal 108 in the form of an elongated strip of air impermeable material has an outward edge 110 and an inward edge 112. The stationary side seal 108 is fixed relative to a stationary side member 20 of the conveyorized table, such as a plenum wall, so as to extend longitudinally along the table over a marginal area of the table located outwardly of and adjacent to the side edge 102 of the work supporting surface. More specifically, as shown in FIGS. 3 and 4, the stationary side seal 108 is coupled at its outward edge 110 to the stationary side member 20 of the conveyorized table. The stationary side seal 108 extends inwardly of the table over the end seal members 12, 12 and terminates at its inward edge 112 inwardly of the side edge 102 of the work supporting surface and over a portion of the bristle blocks 14, 14 adjacent to the side edge. Preferably, the inward edge 112 of the stationary side seal 108 overlies a portion of the set of bristle blocks defining the side edge 102 of the work supporting surface.

A plurality of movable side seals 114, 114 each have an outward edge 116 and an inward edge 118, and are a thin strip of semi air permeable material such as a porous material or a non-permeable material defining a plurality of holes 120, 120 for the passage of air therethrough. Preferably, each of the movable side seals 114 is in one-to-one correspondence with an end seal member 12 and a bristle block 14 of the set of bristle blocks defining the side edge 102 of the work supporting surface such that the movable side seals move along the conveyorized table in unison with the bristle blocks. The movable side seals 114, 114 may be fixedly coupled to either the bristle blocks 14, 14 or the end seal members 12, 12 to permit the movable side seals to move along the conveyorized table at the same speed as the bristle blocks. The outward edge 110 of each of the movable side seals 114, 114 covers at least a portion of an upper surface of the corresponding side seal member 12 and extends inwardly across the side edge 102 of the work supporting surface and covers an area of the corresponding bristle block 14 adjacent to the side edge.

As shown best in FIG. 4, an outward area of the movable side seals 114, 114 underlies the stationary side seal 108 and an inward area of the movable side seals is exposed or extends inwardly over a portion of some of the bristle blocks 14, 14 beyond the inward edge 112 of the stationary side seal 108. In other words, the inward edges 118, 118 of the movable side seals 114, 114 extend inwardly beyond that of the inward edge 112 of the stationary side seal 108. The inward edges 118, 118 of the movable side seals 114, 114 cooperate to define an interface line extending along a length of the table between the movable side seals and the bristle blocks 14, 14.

An overlay sheet 24 (see FIG. 4) of air impermeable material covers work material (not shown) to be conveyed along the length of the conveyorized table. A vacuum holddown system (not shown) disposed underneath the bristle blocks 14, 14 generates an air pressure difference such that an atmospheric pressure at an upper surface of the overlay sheet 24 is higher than at a lower surface of the overlay sheet supported on an upper surface 26 of the bristle blocks in order to draw the work material and overlay sheet 24 downwardly toward and into secure engagement with the upper surface of the bristle blocks. A peripheral portion 30 of the overlay sheet 24 typically extends over and slides along an upper surface 121 of the stationary side seal 108 as the overlay sheet moves with the work material along the length of the conveyorized table. A relatively more inward area 122 of the overlay sheet 24 is firmly held downwardly against and in fixed relation to the exposed area of the movable side seals 114, 114 by the vacuum of the vacuum holddown system which generates a downward pull through the semi air permeable material of the movable side seals.

When in operation, the portion of the overlay sheet 24 adjacent to each side of the interface line 118 is securely held downwardly against and in fixed relation to the exposed portion 122 of the movable side seals 114, 114 and the bristle blocks 14, 14, respectively by the vacuum of the vacuum holddown system. Because the movable side seals 114, 114 and the bristle blocks 14,14 at and immediately adjacent to each side of the interface line are both moving along the conveyorized table in unison with each other, there is no relative movement therebetween, and thus there is no mechanical shear exerted on the bristle columns near or at the interface line. The elimination of mechanical shear significantly minimizes the possibility of the overlay sheet from crevicing into the bristle blocks and thereupon damaging the overlay sheet or jamming the conveyorized table.

An advantage of the side seal assembly 100 embodying the present invention is that the assembly prevents the overlay sheet 24 from crevicing into the bristle blocks 14, 14 at or immediately adjacent to the interface line during conveyance and thereafter taking a permanent set through repeated use.

Another advantage of the present invention is that preventing the overlay sheet 24 from crevicing into the bristle blocks 14, 14 minimizes the possibility of the overlay sheet 24 from jamming with the take-off ramp of the conveyorized table.

Figure 5:
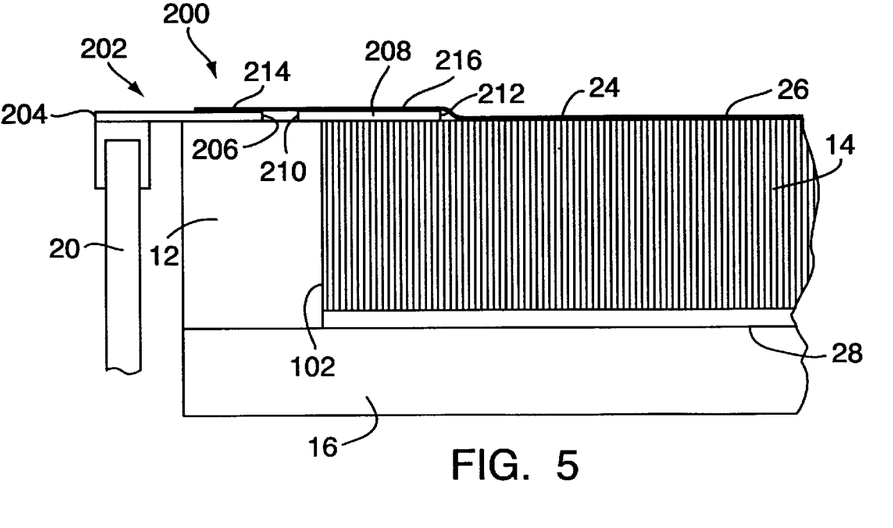
FIG. 5 is a partial, side elevation view of a side seal assembly according to another embodiment of the present invention.

Turning now to FIG. 5, a side seal assembly in accordance with another embodiment of the present invention is generally designated by the reference number 200. Like elements with the previous embodiments are labeled with like reference numbers. The side seal assembly includes a stationary side seal 202 in the form of an elongated strip of air impermeable material. The stationary side seal 202 has an outward edge 204 and an inward edge 206, and is fixed relative to a stationary side member 20 of the conveyorized table so as to extend longitudinally along the table over a marginal area of the table located outwardly of and adjacent to a side edge 102 of the work supporting surface. More specifically, as shown in FIG. 5, the stationary side seal 202 is coupled at its outward edge 204 to the stationary side member 20 of the conveyorized table. The stationary side seal 202 extends inwardly of the table over end seal members 12, 12 (only one shown) and terminates at its inward edge 206 outwardly of the side edge 102 of the work supporting surface.

A plurality of movable side seals 208, 208 (only one shown) each have an outward edge 210 and an inward edge 212, and are a thin strip of semi air permeable material as described in the previous embodiment. Preferably, each of the movable side seals 208 is in one-to-one correspondence with an end seal member 12 and a bristle block 14 of the set of bristle blocks defining the side edge 102 of the work supporting surface such that the movable side seals move along the conveyorized table in unison with the bristle blocks. The movable side seals 208, 208 may be fixedly coupled to either the bristle blocks 14, 14 or the end seal members 12, 12 to permit the movable side seals to move along the conveyorized table at the same speed as the bristle blocks. The outward edge 210 of each of the movable side seals 208, 208 covers at least a portion of an upper surface of the corresponding side seal member 12 and extends inwardly across the side edge 102 of the work supporting surface and covers an area of the corresponding bristle block 14 adjacent to the side edge.

The outward edge 210 of each of the movable side seals 208, 208 is inward of the outward edge 206 of the stationary side seal 202 such that the entire upper surface of the movable side seals is exposed. The inward edges 212, 212 of the movable side seals 208, 208 cooperate to define an interface line extending along a length of the table between the movable side seals and the bristle blocks 14, 14.

An overlay sheet 24 of air impermeable material covers work material (not shown) to be conveyed along the length of the conveyorized table with vacuum holddown. A peripheral portion 214 of the overlay sheet 24 typically extends over and slides along an upper surface of the stationary side seal 202 as the overlay sheet moves with the work material along the length of the conveyorized table. A relatively more inward area 216 of the overlay sheet 24 is firmly held downwardly against and in fixed relation to the movable side seals 208, 208 by the vacuum of the vacuum holddown system which generates a downward pull through the semi air permeable material of the movable side seals.

When in operation, the portion of the overlay sheet 24 adjacent to each side of the interface line 212 is securely held downwardly against and in fixed relation to the movable side seals 208, 208 and the bristle blocks 14, 14, respectively. Because the movable side seals 208, 208 and the bristle blocks 14, 14 at and immediately adjacent to each side of the interface line 212 are both moving along the conveyorized table in unison with each other, there is no relative movement therebetween, and thus there is no mechanical shear exerted on the bristle columns near or at the interface line. The elimination of mechanical shear significantly minimizes the possibility of the overlay sheet 24 from crevicing into the bristle blocks 14, 14 and thereupon damaging the overlay sheet or jamming the conveyorized table.

Figure 6:
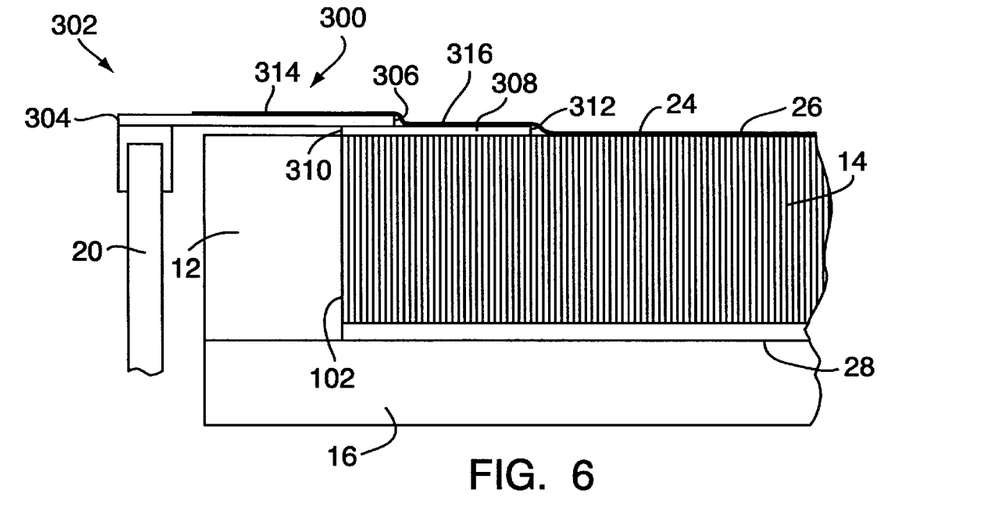
FIG. 6 is a partial, side elevation view of a side seal assembly according to yet another embodiment of the present invention.

Turning now to FIG. 6, a side seal assembly in accordance with another embodiment of the present invention is generally designated by the reference number 300. Like elements with the previous embodiments are labeled with like reference numbers. The side seal assembly includes a stationary side seal 302 in the form of an elongated strip of air impermeable material. The stationary side seal 302 has an outward edge 304 and an inward edge 306, and is fixed relative to a stationary side member 20 of the conveyorized table so as to extend longitudinally along the table over a marginal area of the table located generally outwardly of and adjacent to a side edge 102 of the work supporting surface. More specifically, as shown in FIG. 6, the stationary side seal 302 is coupled at its outward edge 304 to the stationary side member 20 of the conveyorized table. The stationary side seal 302 extends inwardly of the table over end seal members 12, 12 (only one shown) and terminates at its inward edge 306 inwardly of the side edge 102 of the work supporting surface and over a portion of the bristle blocks 14, 14 adjacent to the side edge. Preferably, the inward edge 306 of the stationary side seal 302 overlies a portion of the set of bristle blocks defining the side edge 102 of the work supporting surface.

A plurality of movable side seals 308, 308 (only one shown) each have an outward edge 310 and an inward edge 312, and are a thin strip of semi air permeable material as described in the previous embodiment. Preferably, each of the movable side seals 308 is in one-to-one correspondence with an end seal member 12 and a bristle block 14 of the set of bristle blocks defining the side edge 102 of the work supporting surface such that the movable side seals move along the conveyorized table in unison with the bristle blocks. The movable side seals 308, 308 are fixedly coupled to the bristle blocks 14, 14 to permit the movable side seals to move along the conveyorized table at the same speed as the bristle blocks. The outward edge 310 of each of the movable side seals 308, 308 is adjacent to the side edge 102 so that the movable side seals 308, 308 are substantially entirely supported over the bristle blocks 14, 14.

An outward area of the movable side seals 308, 308 underlies the stationary side seal 302 and an inward area of the movable side seals is exposed or extends inwardly over a portion of some of the bristle blocks 14, 14 beyond the inward edge 306 of the stationary side seal. In other words, the inward edges 312, 312 of the movable side seals 308, 308 extend inwardly beyond that of the inward edge 306 of the stationary side seal 302. The inward edges 312, 312 of the movable side seals 308, 308 cooperate to define an interface line extending along a length of the table between the movable side seals and the bristle blocks 14, 14.

An overlay sheet 24 of air impermeable material covers work material (not shown) to be conveyed along the length of the conveyorized table with vacuum holddown. A peripheral portion 314 of the overlay sheet 24 typically extends over and slides along an upper surface of the stationary side seal 302 as the overlay sheet moves with the work material along the length of the conveyorized table. A relatively more inward area 316 of the overlay sheet 24 is firmly held downwardly against and in fixed relation to the movable side seals 308, 308 by the vacuum of the vacuum holddown system which generates a downward pull through the semi air permeable material of the movable side seals.

When in operation, the portion of the overlay sheet 24 adjacent to each side of the interface line 312 is securely held downwardly against and in fixed relation to the movable side seals 308, 308 and the bristle blocks 14, 14, respectively. Because the movable side seals 308, 308 and the bristle blocks 14, 14 at and immediately adjacent to each side of the interface line 312 are both moving along the conveyorized table in unison with each other, there is no relative movement therebetween, and thus there is no mechanical shear exerted on the bristle columns near or at the interface line. The elimination of mechanical shear significantly minimizes the possibility of the overlay sheet 24 from crevicing into the bristle blocks 14, 14 and thereupon damaging the overlay sheet or jamming the conveyorized table.

Figure 7:
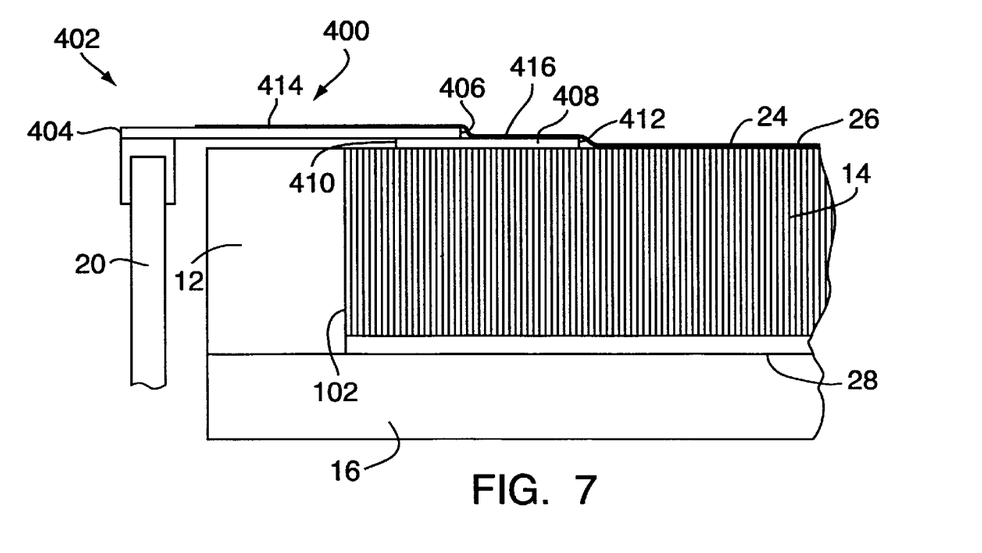
FIG. 7 is a partial, side elevation view of a side seal assembly according to a further embodiment of the present invention.

Turning now to FIG. 7, a side seal assembly in accordance with another embodiment of the present invention is generally designated by the reference number 400. Like elements with the previous embodiments are labeled with like reference numbers. The side seal assembly includes a stationary side seal 402 in the form of an elongated strip of air impermeable material. The stationary side seal 402 has an outward edge 404 and an inward edge 406, and is fixed relative to a stationary side member 20 of the conveyorized table so as to extend longitudinally along the table over a marginal area of the table located generally outwardly of and adjacent to a side edge 102 of the work supporting surface. More specifically, as shown in FIG. 7, the stationary side seal 402 is coupled at its outward edge 404 to the stationary side member 20 of the conveyorized table. The stationary side seal 402 extends inwardly of the table over end seal members 12, 12 (only one shown) and terminates at its inward edge 406 inwardly of the side edge 102 of the work supporting surface and over a portion of the bristle blocks 14, 14 adjacent to the side edge. Preferably, the inward edge 406 of the stationary side seal 402 overlies a portion of the set of bristle blocks defining the side edge 102 of the work supporting surface.

A plurality of movable side seals 408, 408 (only one shown) each have an outward edge 410 and an inward edge 412, and are a thin strip of semi air permeable material as described in the previous embodiment. Preferably, each of the movable side seals 408 is in one-to-one correspondence with an end seal member 12 and a bristle block 14 of the set of bristle blocks defining the side edge 102 of the work supporting surface such that the movable side seals move along the conveyorized table in unison with the bristle blocks. The movable side seals 408, 408 are fixedly coupled to the bristle blocks 14, 14 to permit the movable side seals to move along the conveyorized table at the same speed as the bristle blocks. The outward edge 410 of each of the movable side seals 408, 408 is inward of the side edge 102 so that the movable side seals 408, 408 are entirely supported over the bristle blocks 14, 14.

An outward area of the movable side seals 408, 408 underlies the stationary side seal 402 and an inward area of the movable side seals is exposed or extends inwardly over a portion of some of the bristle blocks 14, 14 beyond the inward edge 406 of the stationary side seal. In other words, the inward edges 412, 412 of the movable side seals 408, 408 extend inwardly beyond that of the inward edge 406 of the stationary side seal 402. The inward edges 412, 412 of the movable side seals 408, 408 cooperate to define an interface line extending along a length of the table between the movable side seals and the bristle blocks 14, 14.

An overlay sheet 24 of air impermeable material covers work material (not shown) to be conveyed along the length of the conveyorized table with vacuum holddown. A peripheral portion 414 of the overlay sheet 24 typically extends over and slides along an upper surface of the stationary side seal 402 as the overlay sheet moves with the work material along the length of the conveyorized table. A relatively more inward area 416 of the overlay sheet 24 is firmly held downwardly against and in fixed relation to the movable side seals 408, 408 by the vacuum of the vacuum holddown system which generates a downward pull through the semi air permeable material of the movable side seals.

When in operation, the portion of the overlay sheet 24 adjacent to each side of the interface line 412 is securely held downwardly against and in fixed relation to the movable side seals 408, 408 and the bristle blocks 14, 14, respectively. Because the movable side seals 408, 408 and the bristle blocks 14, 14 at and immediately adjacent to each side of the interface line 412 are both moving along the conveyorized table in unison with each other, there is no relative movement therebetween, and thus there is no mechanical shear exerted on the bristle columns near or at the interface line. The elimination of mechanical shear significantly minimizes the possibility of the overlay sheet 24 from crevicing into the bristle blocks 14, 14 and thereupon damaging the overlay sheet or jamming the conveyorized table.

Figure 8:
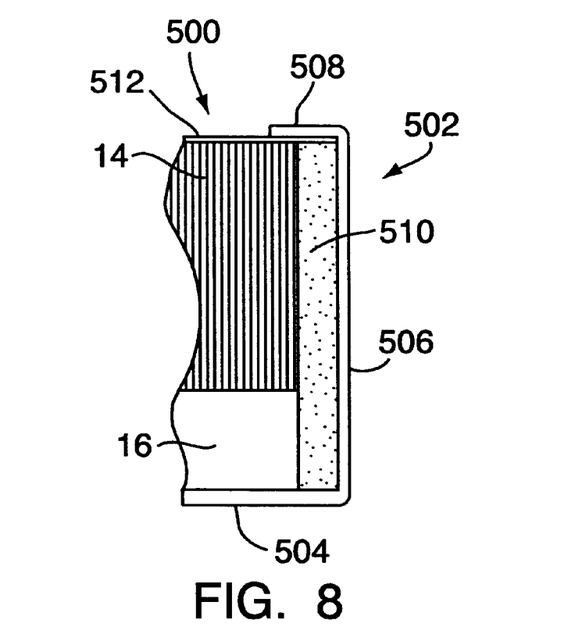
FIG. 8 is a partial, side elevation view of an end seal member forming part of a side seal assembly embodying the present invention.
Figure 9:
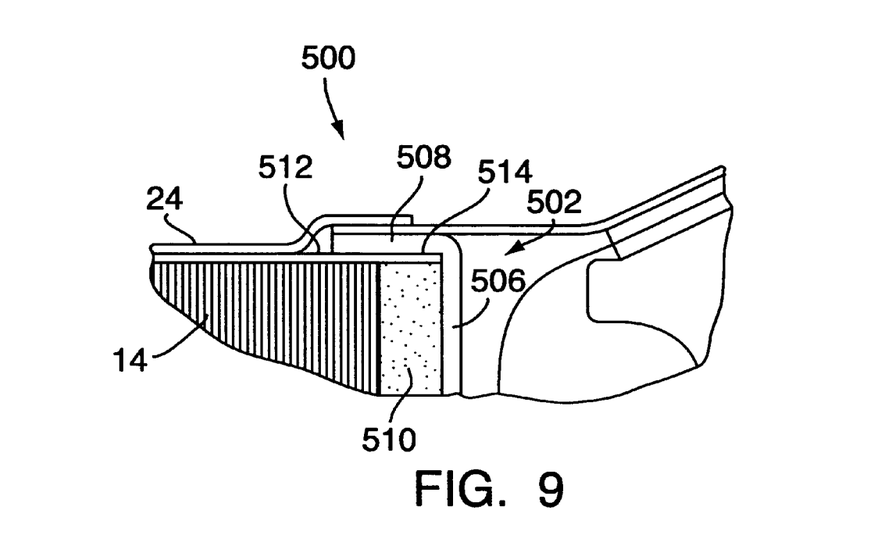
FIG. 9 is a partial, side elevation view of the end seal member of FIG. 8 abutting a side member of a conveyorized work supporting table.

Turning now to FIGS. 8 and 9, an end seal member to be employed as part of a side seal assembly in accordance with the present invention is generally designated by the reference number 500. The end seal member is generally a C-shaped bracket 502 defining a lower portion 504, a middle portion 506 and an upper portion 508. The lower portion 504 extends underneath and is coupled to an associated conveyor undersurface or slat 16. The middle portion 506 is disposed adjacent to an associated stationary side member (not shown) of the conveyorized table. The upper portion 508 extends toward a side edge of the work supporting surface of the conveyorized table.

As shown in FIGS. 8 and 9, the end seal member includes a foam block 510 disposed against the middle portion 506 of the bracket 500 and between the bracket's upper portion 508 and lower portion 504. The foam block 510 is to be interposed between the middle portion 506 of the bracket 500 and a side edge of the work supporting surface of the conveyorized table to provide an abutting surface for the associated bristle block 14. As best shown in FIG. 9, a movable seal 512 is coupled to one of the upper portion 508 of the end seal member and an upper surface portion of an associated bristle block 14 for movement along with the bristle block along a length of the conveyorized table. The movable seal 512 may be coupled to either an upper surface or a lower surface of the upper portion 508 of the end seal member, an upper surface of the foam block 510 or an upper surface of the associated bristle block 14. As shown in FIG. 9, an inward edge 514 of the movable seal is interposed between the upper portion 508 of the end seal member and the foam block 510.

Although this invention has been shown and described with respect to exemplary embodiments thereof, it should be understood by those skilled in the art that the foregoing and various other changes, omissions, and additions in the form and detail thereof may be made therein without departing from the spirit and scope of the invention. Accordingly, the present invention has been shown and described by way of illustration rather than limitation.

What is claimed is:

1. A side seal assembly in a conveyorized work supporting table with vacuum holddown for conveying work material covered with an air impermeable overlay sheet, the table having first and second longitudinally extending side members and having a plurality of bristle blocks forming a work supporting surface and movable by a conveyor undersurface, the work supporting surface having first and second longitudinally extending side edges spaced laterally inwardly of the first and second side members respectively, the bristle blocks including a set of bristle blocks positioned side by side along the length of the table and defining one of the side edges of the work supporting surface, the side seal assembly comprising:

a stationary side seal having an outward edge and an inward edge and fixed relative to one of the side members of the conveyorized table to extend longitudinally along the table over a marginal area of the table located outwardly of and adjacent to one of the side edges of the work supporting surface; and a plurality of movable, semi air permeable side seals each associated with and to be movable in unison with bristle blocks defining the one side edge, each of the movable side seals being a thin strip of material covering an area of the associated bristle block adjacent to the side edge to inhibit the overlay sheet from being drawn by the vacuum of the vacuum holddown into the bristles of the bristle block in the covered area.

2. A side seal assembly for a conveyorized table as defined in claim 1, wherein each of the movable side seals is an air permeable material.

3. A side seal assembly for a conveyorized table as defined in claim 1, wherein each of the movable side seals defines a plurality of holes for accommodating air flow through the side seal.

4. A side seal assembly for a conveyorized table as defined in claim 1, further including a plurality of end seal members, each associated with a movable side seal and a bristle block partly defining a side edge of the table surface, each of the end seal members to be interposed between a side member of the table and a side edge of the table surface partly formed by the associated bristle block for movement with the bristle block, and wherein each of the movable side seals is fixedly coupled to one of an associated end seal member and an associated bristle block.

5. A side seal assembly for a conveyorized table as defined in claim 4, wherein each of the movable side seals is fixedly coupled to the associated end seal member.

6. A side seal assembly for a conveyorized table as defined in claim 4, wherein each of the movable side seals is to be fixedly coupled to the associated bristle block.

7. A side seal assembly for a conveyorized table as defined in claim 4, wherein the inward edge of each of the stationary side seals is partially to overly the bristle blocks.

8. A side seal assembly for a conveyorized table as defined in claim 4, wherein each of the end seal members defines a lower surface having a plurality of projections extending downwardly from the lower surface for being received into an associated mounting hole defined in the conveyor undersurface.

9. A side seal assembly for a conveyorized table as defined in claim 4, wherein each of the end seal members is a generally C-shaped bracket defining lower, middle and upper portions, the lower portion to be coupled to the conveyor undersurface, the middle portion to be disposed adjacent to an associated side member of the table, and the upper portion to extend toward a side edge of the table surface.

10. A side seal assembly for a conveyorized table as defined in claim 9, wherein a foam block substantially extends between the upper and the lower portions of each end seal member, and is to be interposed between the middle portion of each of the end seal members and a side edge of the work supporting surface partly formed by an associated bristle block to provide an abutting surface for the associated bristle block.

11. A side seal assembly for a conveyorized table as defined in claim 10, wherein each of the movable side seals is partially interposed between the upper portion of an associated end seal member and an associated foam block.

* * * * *